United States Patent [19]

Gutz et al.

[11] Patent Number: 5,072,407
[45] Date of Patent: Dec. 10, 1991

[54] SERIAL DATA RATE DETECTION METHOD AND APPARATUS

[75] Inventors: Steven J. Gutz, Petawawa; Charles M. Storry, Oxford Mills; Craig P. Twardy, Ottawa, all of Canada

[73] Assignee: Gandalf Technologies, Inc., Ontario, Canada

[21] Appl. No.: 462,134

[22] Filed: Jan. 8, 1990

[51] Int. Cl.[5] ............................................. H04B 1/38
[52] U.S. Cl. .................................... 364/514; 375/121
[58] Field of Search ......................... 364/514; 370/84; 307/271; 375/121; 371/5.5

[56] References Cited

U.S. PATENT DOCUMENTS

| | | | |
|---|---|---|---|
| 3,676,859 | 7/1972 | Hollaway et al. | 377/5.5 |
| 3,696,338 | 10/1972 | Preiss | 364/200 |
| 4,001,504 | 1/1977 | Hendrickson | 375/121 |
| 4,110,558 | 8/1978 | Kageyama et al. | 371/5.5 |
| 4,122,393 | 10/1978 | Gordy et al. | 375/120 |
| 4,606,044 | 8/1986 | Kudo | 371/5.5 |
| 4,748,625 | 5/1988 | Krause et al. | 371/5.5 |
| 4,761,800 | 8/1988 | Lese et al. | 375/121 |
| 4,956,851 | 9/1990 | Wolensky et al. | 375/121 |

OTHER PUBLICATIONS

Zilog, "Microprocessor Applications Reference Book", vol. 1, Jul. 1981, pp. I53-I55.
AT&T, "Data Communications", Jan. 1987, pp. 3-21-7-3-234.

Primary Examiner—Parshotam S. Lall
Assistant Examiner—Ellis B. Ramirez
Attorney, Agent, or Firm—Perman & Green

[57] ABSTRACT

A system and method are described for bit rate detection in a serial data communication system, the system employing a data rate prompt of a pair of opposite value data bits which follow a series of idle bits. In a first embodiment a receiving port employs a clocked delay element and a set of data clock rates, each data clock rate being a multiple N of one of a set of established bit transmission rates, ranging from a highest expected bit rate to a lowest expected bit rate. The bit rate detection method comprises: clocking the delay element at the highest data clock rate, upon the sensing of one of the opposite value data rate prompt bits at the delay element, to step the value of the sensed bit into the delay element. After a predetermined number of data clock pulses have stepped the value of the sensed bit into the delay element, the system compares the bit value at an input to the delay element and the bit value in a bit position of the delay element. If the comparison indicates an equality of bit values, the delay element is clocked at a lower data clock rate until the comparing step indicates an inequality of bit values. At this point, the bit rate has been determined.

Another embodiment is also described wherein a pair of counters are substituted for the delay element.

20 Claims, 5 Drawing Sheets

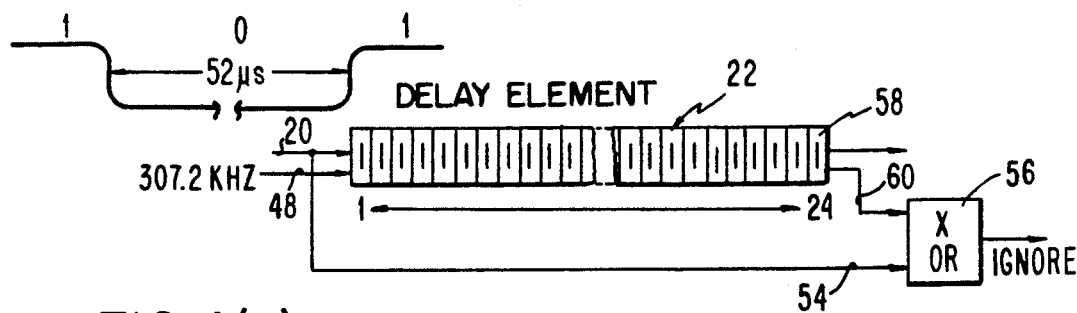
FIG.4(a) 19.2 Kb/s
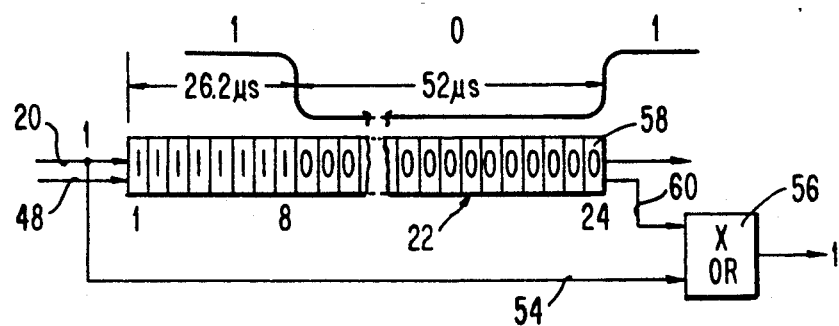
FIG.4(b) AFTER 24 SHIFTS AT 3.26μs/SHIFT
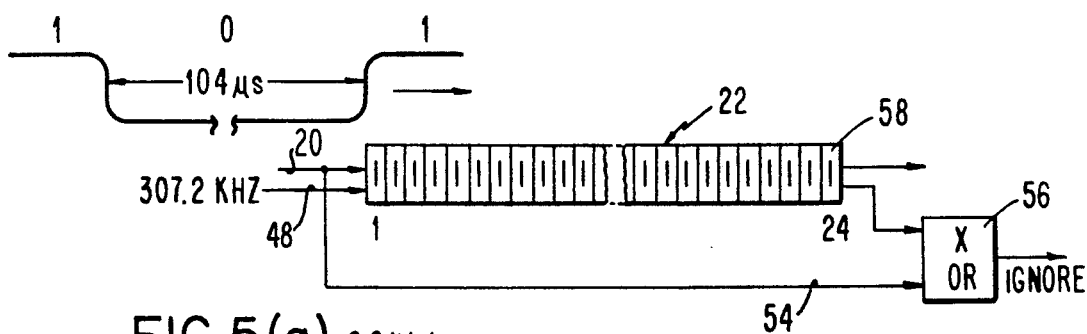
FIG.5(a) 9.6 Kb/s
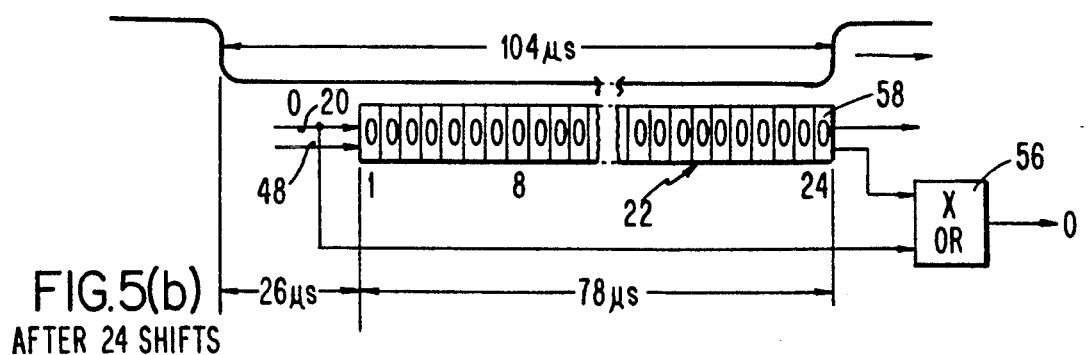
FIG.5(b) AFTER 24 SHIFTS

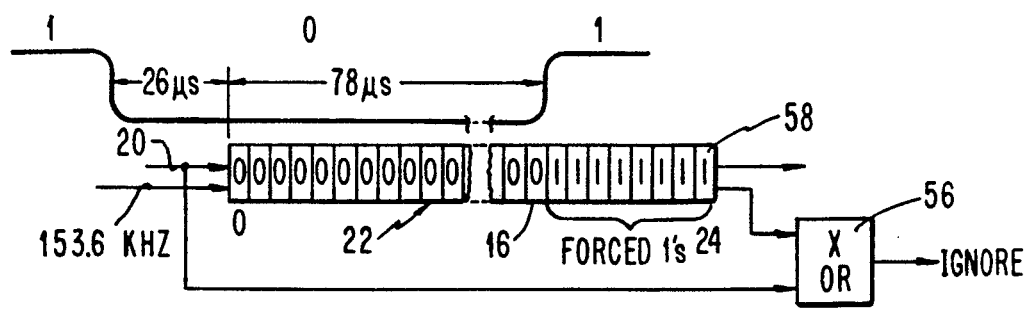
FIG. 6a  FORCE 1's
REDUCE CLOCK RATE BY 1/2
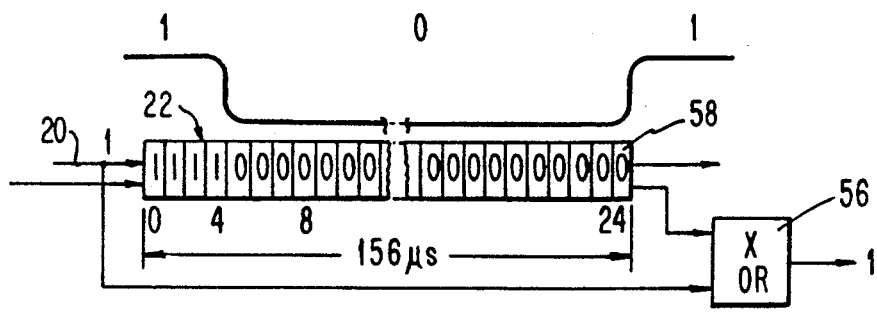
FIG. 6b (AFTER 8 SHIFTS, 52µs
AT 6.52 µs/SHIFT
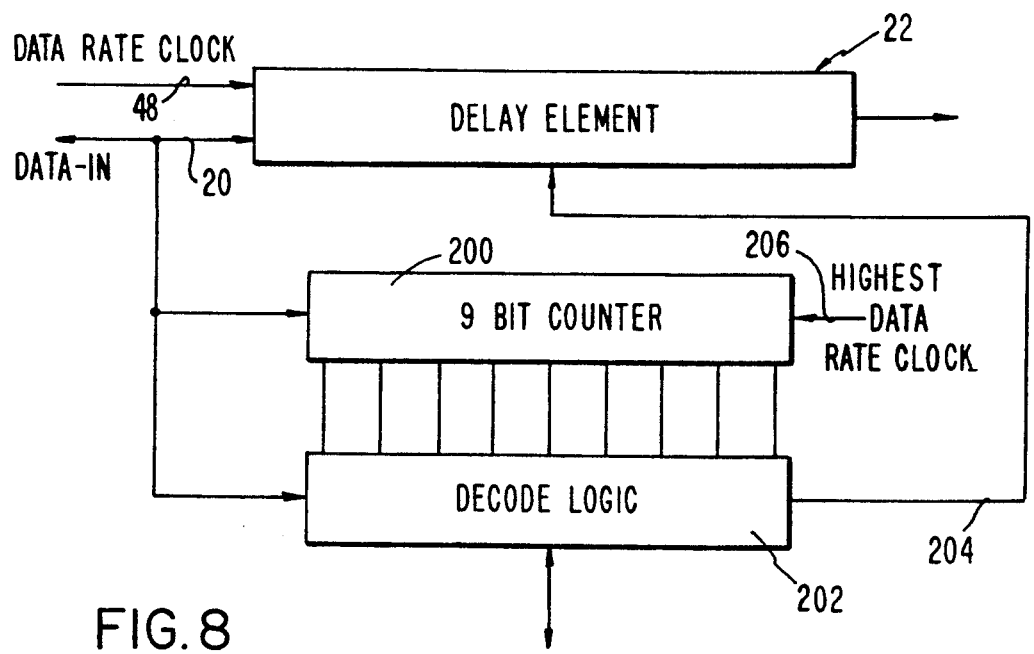
FIG. 8

SERIAL DATA RATE DETECTION METHOD AND APPARATUS

FIELD OF THE INVENTION

This invention relates to the automatic detection of serial data rates, and more particularly to an improved method and apparatus for serial data rate detection which is capable of a synchronous, multichannel applications.

BACKGROUND OF THE INVENTION

In typical serial data communication systems, a desired bit rate is either user-selectable, via a switch bank or non-variable and "hard-coded" in the software. Many serial data communication devices have the capability of both transmitting and receiving multiple data rates. For instance, certain modems are capable of transmitting data at 19,200 bits per second, 9,600 bits per second, 4,800 bits per second, etc. When a sequence of serial bits is thus received over a communication link, the receiving port must determine the data rate of the incoming data stream so that its internal circuitry can be set to accommodate the signal flow (sometimes referred to as an "autobaud" process).

In typical serial applications, a rate identifying character (i.e. rate "prompt" character) is received, followed by a specified amount of guard time. This idle time permits the receiving device to configure its data rate without concern for loss of information. In many applications, the rate prompt character is positioned at the beginning of a lengthy data stream, and there is only one bit time separating it from the next character. In such systems, the task of automatic data rate determination (i.e. "autobauding") is complicated if more than one serial channel must be monitored simultaneously.

Manufacturers of modems have standardized on the use of the characters "AT" as a rate prompt to determine the baud rate of a received information string. The actual characters in the AT prompt that are used for autobaud detection have a start bit whose value is zero and a succeeding bit with a value of one. Therefore, although the AT character string is commonly used as a data rate prompt, half of the characters in the standard character set have the same initial characteristics. This fact presents significant problems when a receiving port attempts to synchronize onto an incoming data stream and the AT prompt is not that which has been transmitted, but rather some other set of data characters. The result, obviously, is an erroneous autobaud determination, with a resultant loss of data.

A number of methods exist to detect serial data rates. Most, if not all, perform by a computer-based, software-intensive technique and are typically carried out by the main controlling element in the receiving port. In most cases, the key to rate detection is the time duration of the first bit received. This bit is known as the start bit and is characterized by the value of zero.

One method for achieving data rate detection is by measuring the width of the received start bit. This method requires that the data stream be initially sampled at the highest possible bit rate. Then, by counting the number of zero bits read, the data rate is determined. The algorithm for of this determination can be expressed mathematically by:

$$n = rate/b$$

where n is the number of zero bits read during the start bit, "rate" is the highest possible data rate, and "b" is the actual transmission rate of the incoming data. This algorithm is described in detail in the "Microprocessor Applications Reference Book", Vol. 1, pp. 1-53 through 1-55, published by Zilog, Inc., July, 1981.

Despite the fact that the above-described algorithm and method have been used for years, they suffer from certain disadvantages. Due to the fact that the method is software based, it cannot autobaud reliably on more than one channel at a time. Additionally, it is known to fail due to its inability to set the data clock in time to receive bits which immediately follow the start bit. The result is lost information. Additionally, the character used for rate detection is either lost or must by synthesized when this technique is implemented. As above stated, if a character set other than AT, is received, the received character set is lost and a retransmission must occur. Finally, in all known systems which employ software-based, data rate detection, autobauding is difficult to implement at speeds greater than 19,200 bits per second. This is due to the fact that typical commercial microcontrollers execute approximately one instruction every microsecond. This renders a measurement of a 52 microsecond start bit (at 19,200 bits per second) extraordinarily difficult using current software technology.

Accordingly, it is an object of this invention to provide a data rate detection system and method which does not lose data during the autobaud process.

It is a further object of this invention to provide an autobaud system which is largely hardware based and avoids the prior software-based autobaud limitations.

It is still another object of this invention to provide an autobaud method wherein data immediately following the autobaud prompt can be immediately accommodated without guard a time.

SUMMARY OF THE INVENTION

A system and method are described for bit rate detection in a serial data communication system, the system employing a data rate prompt of a pair of opposite value data bits which follow a series of idle bits. In a first embodiment, a receiving port employs a clocked delay element and a set of data clock rates, each data clock rate being a multiple N of one of a set of established bit transmission rates, ranging from a highest expected bit rate to a lowest expected bit rate. The bit rate detection method comprises: clocking the delay element at the highest data clock rate upon the sensing of one of the opposite value data rate prompt bits at the delay element, to step the value of the sensed bit into the delay element. After a predetermined number of data clock pulses have stepped the value of the sensed bit into the delay element, the system compares the bit value at an input to the delay element and the bit value in a bit position of the delay element. If the comparison indicates an equality of bit values, the delay element is clocked at a lower data clock rate until the comparing step indicates an inequality of bit values. At this point, the bit rate has been determined.

Another embodiment is also described wherein a pair of counters are substituted for the delay element.

DESCRIPTION OF THE DRAWINGS

FIG. 4(a) illustrates a delay element as a start bit arrives at its input.

FIG. 4(b) illustrates the delay element after the start bit has been shifted using the highest data rate clock.

FIG. 5(a) illustrates the delay element when a lower data rate signal is received at its input.

FIG. 5(b) shows the state of the delay element after 24 shifts, employing the highest data rate clock.

FIG. 6(a) shows the delay element as the shift rate is reduced to a next lower data rate clock.

FIG. 6(b) illustrates the delay element and the conditions which exist to enable an output indicating that the proper bit rate has been determined.

FIG. 8 is a block diagram of a still further embodiment of the invention.

DETAILED DESCRIPTION OF THE INVENTION

Figure 1:
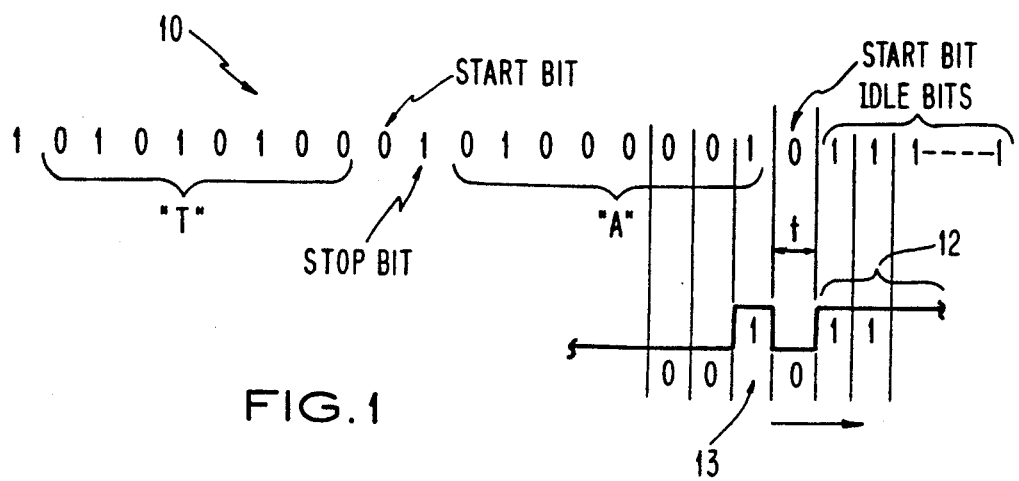
FIG. 1 is a bit chart and waveform diagram showing bits employed in the AT prompt protocol.

Referring now to FIG. 1, a received bit stream 10 is illustrated proceeding in a rightward direction in the drawing. Initially, a series of idle one bits are received indicating that no information is being transmitted. The data level received during the idle bit time is illustrated by portion 12 of waveform 13. As aforestated, the data communications industry has largely accepted the AT character string as a prompt for determining the baud rate of a received information character string. The characters are indicated in hexadecimal and, as can be seen in FIG. 1, A=01000001 and T=01010100. Each character is preceded by a zero level start bit and is terminated by a one level stop bit. As indicated in the introduction to this specification, baud rates have been determined heretofore by detecting the width of the zero level start bit and converting that width into a baud rate. As will be seen hereinafter, this invention employs a hardware-based system which employs a different algorithm to automatically determine the data rate.

Figure 2:
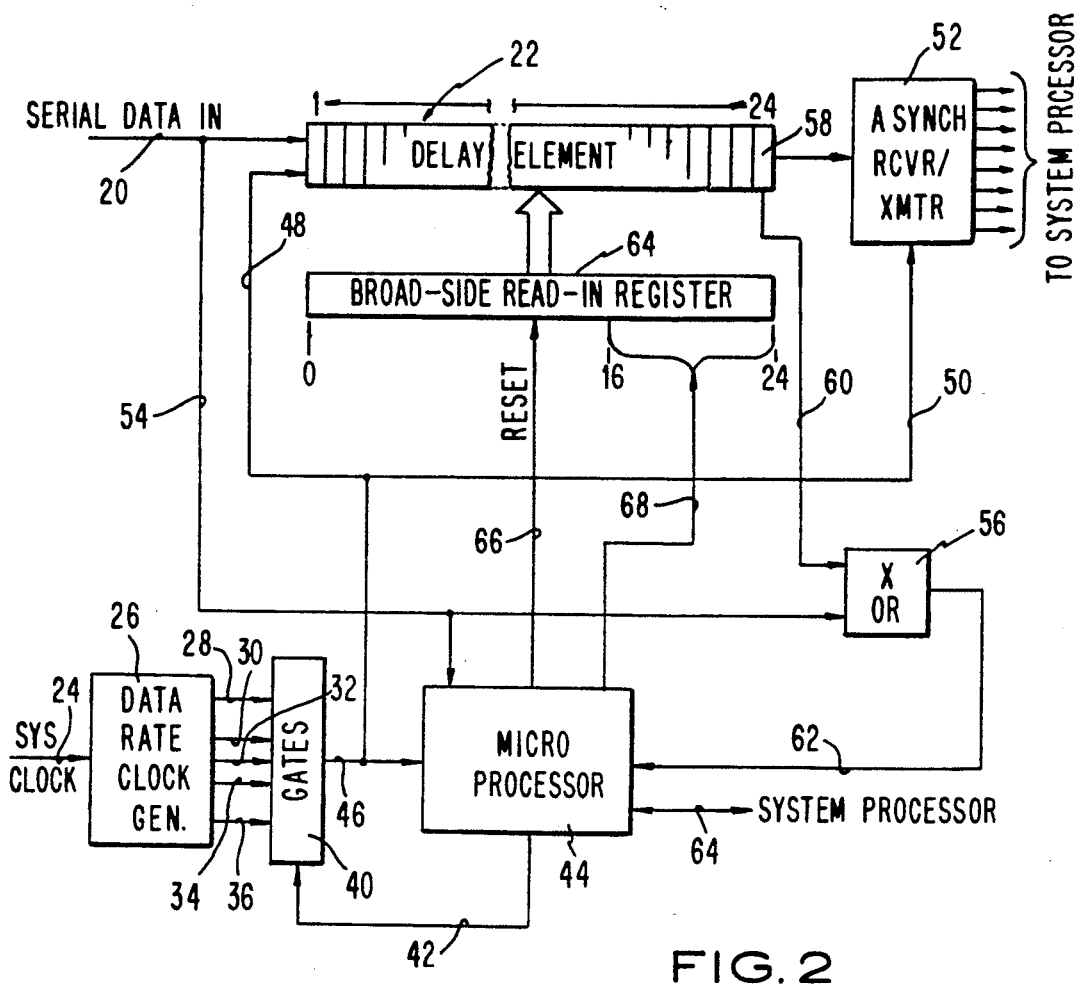
FIG. 2 is a block diagram of the bit rate detection invention.

Referring now to the embodiment shown in FIG. 2, serial data is received at a port 20 and is fed to a multi-position delay element 22. A system clock signal is applied via input 24 to a data rate clock generator 26. Data rate clock generator 26 provides a plurality of outputs, each output evidencing a multiple of one of a plurality of expected bit rates. It continuously generates a plurality of data rate clock outputs, each data rate clock output being a multiple N of an expected bit rate. For instance, assuming N=16, output line 28 will have continuously applied thereto a frequency which is 16×19,200 bits per second (the highest expected baud rate). The same multiplier will be used on output lines 30, 32, 34, and 36 for bit rates of 9,600 bits per second, 4,800 bits per second, 2,400 bits per second and 1,200 bits per second, respectively.

Each output from data rate clock generator 26 is applied to a set of gates 40, each of whose open or closed state is controlled via line 42 from microprocessor 44. A selected data rate clock from generator 26 is thus gated by gates 40 and is applied, via line 46, to both microprocessor 44 and as a stepping input to delay element 22 via line 48. The data rate clock signal is also applied via line 50 to a synchronous receiver/transmitter 52.

In addition to input serial data being applied via port 20 to delay element 22, it is also applied, via line 54 to microprocessor 44 and as one input to exclusive OR circuit 56. Another input to exclusive OR circuit 56 is applied via line 60 from the last stage 58 of delay element 22. As will be understood, an output from exclusive OR circuit 56 is the signal which indicates that the data rate of an incoming signal has been determined. That indication is applied to microprocessor 44 via line 62. A broad-side, read-in register 64 is employed to both reset delay element 22 and, to force one bits into certain of its stages upon a determination being made that a bit rate has not been properly determined. The controls for broad-side read-in register 64 are fed from microprocessor 44 via lines 66 and 68 respectively. Line 69 connects microprocessor 44 to a system processor which both collects the incoming data and controls the overall operation of the data rate detection apparatus. It should be understood that microprocessor 44 can be a dedicated, software-controlled processor or it can be replaced by a hard-wired logic state machine. The term microprocessor will be used herein to generically refer to both types of equipment.

Delay element 22 is preferably a multistage, serial shift register capable of being clocked at a multiple N of the highest expected bit rate. While a multiplier of 16 will be hereinafter employed for this description, it should be understood that other multipliers are also acceptable. Using a 16 times multiplier, the data rate clock at 19.2 kbits per second is 307.2 kHz (one pulse per every 3.26 microseconds). Delay element 22 is provided with a sufficient number of stages so that its length is equal to 1.5 bit periods at the highest expected input bit rate. Thus, assuming N=16, delay element 22 is provided with 24 serially connected stages. The shift stages, over and above 16, enable the delay element to accommodate incoming bits whose width varies by as much as +50% over an expected bit duration.

Figure 3:
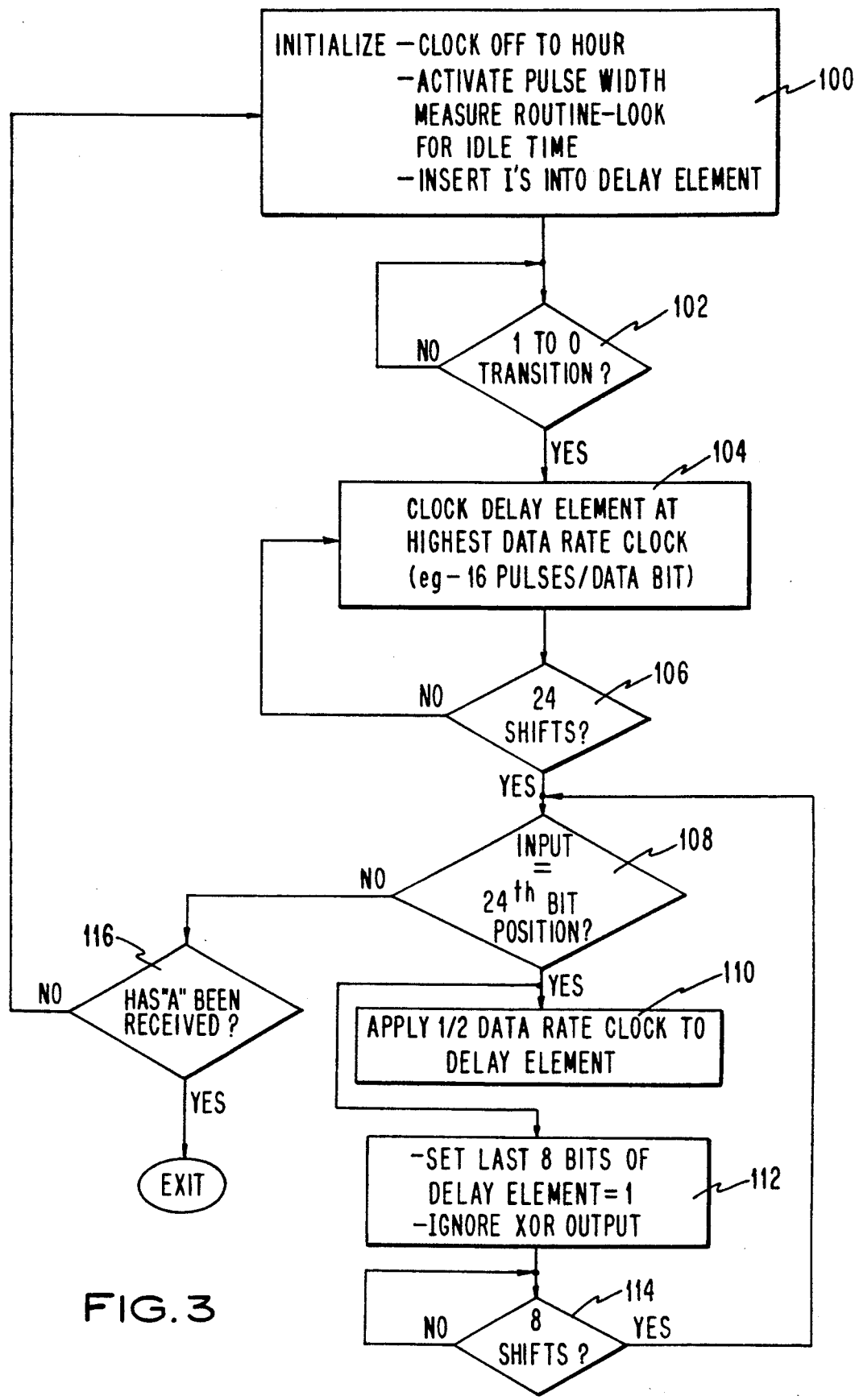
FIG. 3 is a high level flow diagram of a program employed during the operation of the invention of FIG. 2.

Referring now to FIG. 3, the algorithm employed by microprocessor 44 to determine the incoming bit rate will be described. In summary, microprocessor 44 "looks for" a high ("one") output from exclusive OR 56 when the leading edge of a start bit is shifted into stage 58 in delay element 22. The high output from exclusive OR 56 indicates that the zero start bit is totally within the confines of delay element 22; and that the initial one bit in the "A" prompt has arrived and is being shifted into element 22. This condition provides differing inputs to exclusive OR 56 causing it's output to rise to the high level. If exclusive OR 56 does not manifest a high output when the leading edge of the new level start bit arrives at stage 58, then microprocessor 44 gates a next lower data rate clock to delay element 22 and repeats the process.

In FIG. 3, the algorithm for data rate determination employed by microprocessor 44 is shown. Box 100 illustrates that a series of initialization steps occur as follows: asynchronous receiver transmitter 52 receives no data rate clock signal; the pulse width measurement routine is activated in microprocessor 44 causing it to monitor incoming serial data arriving at port 20 for a series of idle time one bits; and microprocessor 44 causes a broad-side read-in of ones into all stages of delay element 22 from register 64.

As shown in decision box 102, microprocessor 44 continues to examine the incoming bit stream, all the while looking for a one-to-zero transition indicating a change from a one level idle bit to a zero level start bit (see FIG. 1). If no such level transition is seen, the monitoring status is continued. If a one-to-zero transition is sensed, microprocessor 44, via line 42, enables gates 40 to place on line 46, the highest data rate clock. In this case, it is assumed that the highest data rate is 19.2 kbits per second and since the data rate clock generator is providing 16 pulses per data bit, the effective clock rate applied to line 46 is 307.2 kHz. Those clock pulses are both applied as stepping signals to delay element 22 via conductor 48, and also to microprocessor 44 which maintains a running pulse count. The applied clock pulses cause the incoming start pulse zero level to be stepped into succeeding stages of delay element 22, with 24 clock pulses causing the zero level leading edge of the start pulse to arrive at stage 58.

An example helpful in understanding the operation of this invention is shown in FIGS. 4(a) and 4(b). There, delay element 22 and exclusive OR 56 are shown, along with their operational interconnections. Assuming a 19.2 kbit per second start pulse is received, that pulse approximately is 52 microseconds long. As aforestated, initially, delay element 22 has ones forced into all of its stages (see FIG. 4(a)). While a high output from exclusive OR 56 indicates to microprocessor 44 that a proper bit rate has been detected, such an indication is only valid when the start pulse level reaches stage 58. Therefore, microprocessor 44 is programmed to ignore exclusive OR 56 until the leading edge of the start pulse is manifested at shift stage 58.

The shift rate of data into delay element 22, when a 307.2 kHz pulse rate is applied, is 3.26 microseconds shift. Thus, as shown in FIG. 4(b), after 24 shifts the start pulse has moved as shown and its leading edge value is now present in stage 58. In addition, the lagging edge of the start pulse has also been shifted into delay element 22 along with a portion of the following initial one bit of the "A". At this time, the inputs to exclusive OR 56 are, respectively, zero on line 60 and one on line 54, causing a high output to be passed to microprocessor 44. This situation indicates that a 19.2 kbit per second start pulse has, in fact, been received and that the applied data rate clock is appropriate.

If, on the other hand, a 9.6 kbit per second start pulse had been received, the situation would be as shown in FIGS. 5(a) and 5(b). The duration of a start pulse at 9.6 kbits per second is 104 microseconds. Thus, with 3.2 microseconds per shift, only 78 microseconds of the 104 microsecond start pulse would have been shifted into delay element 22 when the leading edge of the start pulse arrives at stage 58. Now, when the output of exclusive OR 56 is examined by microprocessor 44, it finds a down level due to the fact that the level at input port 20 is the same down level as appears in stage 58. It can be seen from FIG. 5(b), that at this time, 26 microseconds of the start pulse remains to be shifted into delay element 22.

Returning to FIG. 3, the algorithm, after determining that 24 shifts have occurred in delay element 22 (decision box 106), determines whether the input level to delay element 22 is equal to the 24th bit position level (decision box 108). If they are the same, e.g.. see FIG. 5(b), microprocessor 44 recognizes that the data rate clock is set too high. In such case (box 110), microprocessor 44 controls gates 40 to apply the next lower data rate clock onto line 46 (see FIG. 2). Simultaneously, microprocessor 44, via line 68, forces broadside, read-in register 64 to read ones into the last eight stages of delay element 22. The output of exclusive OR 56 is ignored for the time being. The results of the above actions are shown in FIG. 6(a). The newly applied lower data rate clock is 153.6 kHz (16 times 9.6 kbits per second), and the last eight stages of element 22 manifest one states. The applied 153.6 kHz data rate clock steps delay element 22 every 6.52 microseconds. Thus the portion of the start pulse in the first 16 stages of delay element 22 has an effective time length of 78 microseconds and the last eight stages have an effective time length of 52.16 microseconds. Since only 26 microseconds of the start pulse remain to be stepped into delay element 22, it can be seen, as shown in FIG. 6(b), that after 8 shifts, the leading edge of the start pulse arrives at stage 58 and its lagging edge is also within the delay element 22. Therefore, when microprocessor 44 is now enabled to examine the output of exclusive OR 56 and finds a high level manifested, it knows that a proper data rate clock is being generated.

Referring back to FIG. 3, the above described portion of the algorithm is shown by decision box 114. After eight shifts, the output of exclusive OR 56 is examined (decision box 108) and the process is repeated. However, in this case, exclusive OR 56, by providing the high output indicates that the level at the input to delay element 22 is not equal to the level in stage 58 so the program branches to decision box 116. Here, even though it is assumed that the proper data rate clock is now being generated, there are still a number of alphanumerics which may be received which have similar leading data bits as the "AT" prompt. Microprocessor 44 follows the data rate clock determination by determining that an "A" prompt has actually been received. This is accomplished by sensing the succeeding bits after the start bit to determine if a proper hexadecimal A follows. If such is found to be the case, the program exits, now knowing the proper data rate clock is being applied. If, on the other hand, it is determined that an A has not been received, the entire procedure aborts and reinitializes to await the next start bit.

From the above, it can be seen that the data rate clock generator "ratchets" downwardly until the proper data rate clock is determined. At no time is the incoming start bit lost as each time the data rate clock proceeds to a lower clock rate, the start bit is, in essence, reconstituted at a slower data rate. Thus, it can be seen that no data is discarded during the process of data clock rate determination and that the system "autobauds" automatically.

Figure 7:
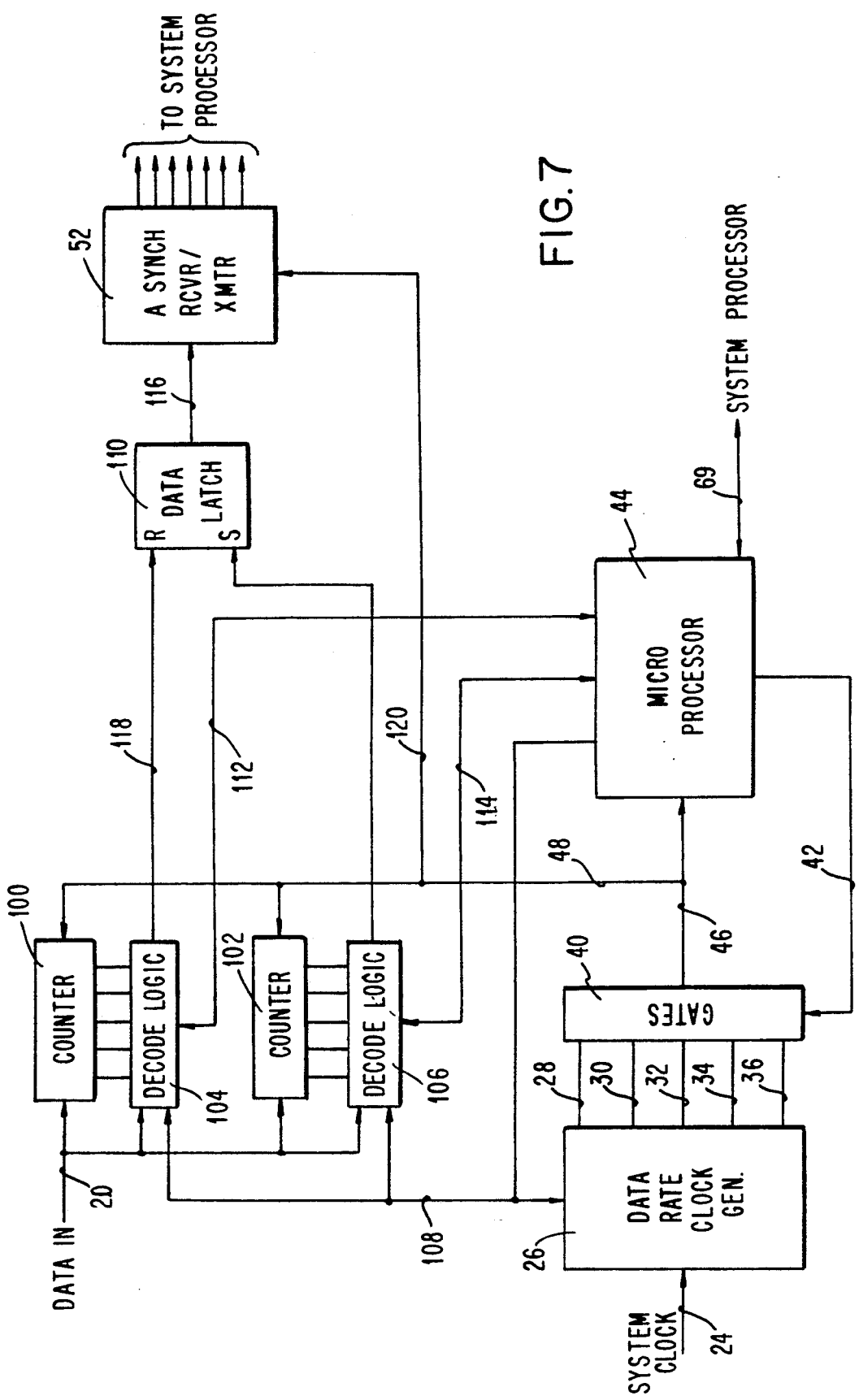
FIG. 7 is a block diagram of further embodiment of the invention

Referring now to FIG. 7, a block diagram is shown of a further embodiment of the invention. This circuit avoids the need for shifting of data through multiple delay stages, and instead, employs a pair of counters to both delay the incoming data and measure the duration of the start bit. Circuit elements shown in FIG. 7 which are common to the embodiment of FIG. 2 are similarly numbered. Counters 100 and 102 are both five bit counters and are connected to the data-in port 20. Additionally, the signals appearing at data-in port 20 are applied to decode logic circuits 104 and 106 respectively. Microprocessor 44 provides an enable/not enable control signal via line 108 to decode logic circuits 104 and 106 and data rate clock generator 26.

The selected data rate clock output from gates 40 is applied via conductor 48 to counters 100 and 102 and serves to step them through their various states. Outputs from decode logic circuits 104 and 106 are respectively applied via lines 118 and 120 to reset and set inputs of a data latch 110. Further, decode logic circuits 104 and 106 provide state indications via lines 112 and 114 to microprocessor 44.

As will be hereinafter understood, counter 100 measures the start bit duration and, additionally, delays any falling edge of an incoming data pulse by 20 clock cycles. Counter 102 is employed to delay any rising edge of a data signal by 20 clock cycles.

Initially, it is assumed that idle bits are present at data-in port 20 and thus, high input levels are applied to decode logic circuits 104 and 106. At this time, microprocessor 44 has issued, via line 108, an enable indication to both decode logics 104 and 106 with the enable signal causing counter 100 to be prepared to count. That enable signal, in combination with the high data level appearing at port 20, causes decode logic circuit 106 to de-enable counter 102. Additionally, decode logic 106 issues a set indication to data latch 110 thereby causing its output on line 116 to be high, indicating a high input level at data-in port 20.

So long as the data-in level at port 20 remains high, nothing happens. When however, the data-in level falls, counter 100 commences counting and a start-bit search sequence is commenced. It will be recalled that at 19,200 bits per second, a nominal start pulse is 52 microseconds long. Furthermore, industry standards require that if the start pulse varies by as much as $\pm/-25\%$, that it is still to be recognized as a start pulse.

At the outset of the data rate search, gates 40 provide the highest data rate clock (19,200 bits per second $\times$ 16) via line 48 to counters 100 and 102. Since a multiplier of 16 is employed to produce the data rate clock signal, it can be understood that each counter will provide 16 counts during the nominal duration of a start pulse (or any data pulse). Accordingly, a count of 12 will indicate a pulse which is at the lower edge of the allowed time duration ($-25\%$) and a count of 19 will indicate a pulse duration at the upper limit of the pulse duration ($+25\%$). Accordingly, if the data-in level on port 20 goes high while counter 100 indicates a count of 11 or less, decode logic 104 concludes that the bit duration is too short to be a start pulse at 19,200 bits per second. As a result, the search aborts.

If the level at data-in port 20 is still low at the 20th count, the pulse width is too long to be a start bit at 19,200 bits per second. Accordingly, decode logic 104 issues an indication via line 112 to microprocessor 44 which, in turn, causes gates 40 to place the next lower data rate clock onto line 48 (16 $\times$ 9,600 bits per second). At the same time, decode logic 104 presets counter 100 to a count of 10 as that is the count which would be indicated by counter 100 had it started at the beginning of start pulse at 9,600 bits per second. (It will be recalled that 9,600 bits per second is 50% of 19,200 bits per second and this equates to 50% of the count of 20 being 10). This results in counter 100 being set as though it had been counting at 16 $\times$ 9,600 bits per second from the commencement of the negative going excursion of the start pulse.

Again, decode logic 104 looks for a combined high data-in level at port 20 and a count emanating from counter 100 between counts 12 and 19. If such a combined state occurs, a valid start pulse has been received at 9,600 bits per second. Nevertheless, counter 100 continues to count until it reaches a count of 20. At this point, a valid start bit indication is issued to microprocessor 44 via line 112 and an output is supplied via line 118 to reset data latch 110 to the low state. The result of that reset action is to set the state of data latch 110 to the input state of the data which occurred 20 counts ago, thus enabling the data state at data-in port 20 to be established in a delayed mode.

Counter 102 comes into action when counter 100 determines that a proper start bit has been received. In specific, it immediately commences counting when a high level appears at data-in port 20 and counter 100 manifests a count between 12 and 19. It should be recalled that counter 102 is solely employed to determine the rising edge of data signals and to delay each rising edge by 20 counts. Counter 102 continues its count until it reaches 20, at which point decode logic 106 issues a set signal on line 120 to data latch 110. As a result, the output on line 116 rises indicating a first one bit of the A prompt. If, for some reason, the level at data-in port 20 falls before counter 102 reaches a count of 9, an abort occurs due to the fact that the subsequently received signal is too short to be a valid data pulse.

When counter 100 reaches a count of 20 it is automatically reset to a count of 0 to await the next negative going excursion at data-in port 20. When that data-in excursion occurs, as aforestated, decode logic 104 does not issue a reset signal to data latch 110 until counter 100 reaches a count of 20. In this manner, input data signals are thereby preserved, but delayed by a count of 20 clock pulses.

If the procedure, as above indicated for data rate determination, is not successful at 9,600 bits per second, the system continues to ratchet down to lower data rate clocks until an appropriate start bit duration is determined.

In the above description, while the data rate clock divisions are shown as being 50%, other non-integer divisions could be employed. However, this would require correspondingly different data rate clocks and an adjustment of the length of either the delay element or the counts indicated by counters 100 and 102.

Turning now to FIG. 8, another embodiment of the invention is shown wherein a "long counter" 200 is employed along with delay element 22. The outputs from counter 200 are applied to decode logic circuit 202. The remaining portions of the circuit are as shown in FIG. 2. Instead of monitoring the various output points from delay element 22 as shown in FIG. 2, counter 200 is clocked at the highest clock rate (16 $\times$ 19,200) when the initial low level is sensed at data-in port 20. Counter 200 is 9 bits long and its various output states indicate the rate of the input data.

When data-in goes low, counter 200 commences counting. If data-in traverses to the high state in the range of 12 to 19 counts, then a 19,200 bit per second start bit has been sensed. If data-in has not traversed to the high state by count 20, then decode logic 202 issues to microprocessor 44 a command to reduce the data rate clock applied to delay element 22 to the next lower data rate clock. In this circuit however, the highest data rate clock continues to be applied to counter 200 via conductor 206. Additionally, before the next lower data rate clock begins stepping delay element 22, its the latter half is loaded with ones.

If the data-in level traverses to the high state between counts 24 and 40 then a 9,600 bit per second level has been found. If the data-in level is not at the high state by count 40, then the data rate clock input to delay element 22 is again changed to the next lower data rate clock and ones are again preloaded into the latter half stages of element 22. The same procedure continues, and if data-in traverses to the high state between counts 48 and 80 then a 4,800 bit per second start level is determined etc. (e.g., If the data-in level traverses to the high state between counts 96 and 160, then a 2,400 bit per second start bit has been determined.)

It should be understood that the aforegoing description is only illustrative of the invention. Various alternatives and modifications can be devised by those skilled in the art without departing from the invention. Accordingly, the present invention is intended to embrace all such alternatives, modifications, and variances which fall within the scope of the intended claims.

What is claimed is:

1. A method for bit rate detection in a serial data communications system, said system employing a rate prompt of a pair of opposite value data bits which follow a series of idle data bits, and further comploying a clocked delay element and generator means for providing a set of data clock rates, each rate being a multiple N of one of a set of established bit transmission rates, ranging from a highest expected bit rate to a lowest expected bit rate, the method comprising:
    a. clocking said delay element at the highest data clock rate, upon the sensing of one of said opposite value bits at said delay element, to step the value of said sensed bit into said delay element;
    b. comparing, after a number of data clock pulses have stepped the value of said sensed bit into said delay element, a received bit value and the value of said sensed bit in a bit position of said delay element; and
    c. clocking said delay element at a lower data clock rate from said generator means if said comparing step (b) indicates an equality of bit values.

2. The method of claim 1 further comprising the additional steps of:
    d. employing said data clock rate to determine the value of received data bits when said comparing step (b) indicates an inequality of bit values.

3. The method of claim 2 wherein each data bit has a predetermined time duration which depends upon the expected bit transmission rate, said delay element, when clocked at said highest data clock rate, having a delay time which exceeds said predetermined time duration of a data bit at said highest bit transmission rate.

4. The method of claim 3 wherein said delay element has about 1.5N storage positions and said comparing step detects the bit value stored in the last of said 1.5N storage positions and compares it with the bit value at an input to said delay element.

5. The method of claim 4 further comprising the step of:
    e. prior to step (a), initializing all storage positions in said delay element by forcing each to store the same bit value.

6. The method of claim 5, further comprising the step of:
    f. delaying step (c) until a plurality of storage positions in said delay element have been forced to store the same bit value.

7. The method of claim 6 wherein step (f) forces ones into the last N/2 storage positions of said delay element.

8. The method of claim 7 wherein step (e) forces all ones into said delay element storage positions.

9. The method of claim 8 wherein said rate prompt comprises a zero level bit followed by a one level bit and said step (a) commences when said zero level bit is sensed.

10. The method of claim 9 wherein said idle data bits comprise a run of one level bit values.

11. Apparatus for bit rate detection in a serial data communication system, said system employing a rate prompt of a pair of opposite value data bits which follow a series of idle data bits, the apparatus comprising:
    multistage delay element having an input for receiving data signals and a stepping input for causing a signal at said input to be stepped through said multistages to a selected stage;
    means for generating a plurality of data clock rates, each rate being a multiple N of one of a set of established bit transmission rates, such transmission rates ranging from a highest rate to a lowest rate;
    comparison means connected to said selected stage of said multistage delay element and said delay element input, for providing an output indicative of the identity or difference of data levels at said selected stage and said input; and
    processor control means connected to said multistage delay element, said data clock rate generating means and said comparison means for enabling said generating means to apply said highest data clock rate to said stepping input upon sensing one of said opposite value data bits at said input, to thereby step the value of said sensed data bit into said delay element and to said selected stage, and for responding to an identity output from said comparison means, indicating a said data bit prompt has not been fully stepped into said delay element, to cause said data clock rate generating means to produce a lower data clock rate.

12. The apparatus as defined in claim 11 wherein said processor control means responds to a difference output from said comparison means by continuing said highest data clock rate and by determining that an alphanumeric, of which said rate prompt is a part, is a proper prompt alphanumeric.

13. The apparatus as defined in claim 12 wherein said comparison means is an exclusive OR circuit.

14. The apparatus as defined in claim 12 wherein said multistage delay element is provided with about 1.5 N stages and said selected stage is a last stage in said delay element.

15. The apparatus as defined in claim 14 further comprising means connected to said processor control means and responsive to an identity output from said comparison means, to set to a predetermined logic state a plurality of latter stages of said multistage delay element, said processor control means only responding to an output from said comparison means when said input data bit value has again been stepped to said selected stage.

16. A method for bit rate detection in a serial communications system, said system employing a rate prompt of a pair of opposite value data bits which follow a series of idle data bits, and further employing a clockable element and generating means for providing a set of data clock rates, each rate being a multiple N of one of a set of established bit transmission rates, ranging from a highest expected bit rate to a lowest expected bit rate, the method comprising:
    a. clocking said element at the highest data clock rate of said set, upon the sensing of one of said opposite value bits at said clockable element, to cause said element to accumulate said clock pulses;
    b. determining, after a number of clock pulses have been accumulated in said element, whether the bit value at an input to said element is at a different bit value from the bit value when said clocking in step (a) commenced; and c. clocking said element at a lower data clock rate from said generating means if said determining step (b) indicates an equality of bit values.

17. The method of claim 16 further comprising the additional step of:
   d. employing the data clock rate to determine the value of received data bits when said determining step (b) indicates a difference of bit values.

18. The method of claim 17 wherein said clockable element is a first counter.

19. The method claim 18 wherein said system includes a second counter and a data latch, said method comprising after step d, the further steps of:
   e. setting said data latch to manifest the level of said bit value at said first counter in step (a), said setting occurring a predetermined number of counts after commencement of said counting; and
   f. resetting said data latch to an opposite bit value when said second counter reaches a predetermined count, said count being commenced in response to a predetermined count of said first counter and the occurrence of an opposite level bit value from said serial data communications system.

20. A method for bit rate detection in a serial data communications system, said system employing a rate prompt of a pair of opposite value data bits which follow a series of idle data bits, and further employing a clocked delay element, a counter and a set of data clock rates, each rate being a multiple N of one of a set of established bit transmission rates, ranging from a highest expected bit rate to a lowest expected bit rate, the method comprising:
   a. clocking said delay element at the highest data clock rate, upon the sensing of one of said opposite value bits at said delay element, to step the value of said sensed bit into said delay element;
   b. operating said counter at said highest data clock rate upon a start of said clocking in step (a);
   c. determining, after a number of data clock pulses have caused said counter to manifest a count, whether the bit value at an input to said delay element is different from the bit value when said clocking step (a) commenced;
   d. clocking said delay element at a lower data clock rate if said comparing step (b) indicates an equality of bit values and continuing to operate said counter at said highest data clock rate; and
   e. employing the data clock rate to determine the value of received data bits when said determining step (c) indicates a difference of bit values.

* * * * *